United States Patent
Kawada et al.

(10) Patent No.: US 10,380,250 B2
(45) Date of Patent: Aug. 13, 2019

(54) ENTAILMENT PAIR EXTENSION APPARATUS, COMPUTER PROGRAM THEREFOR AND QUESTION-ANSWERING SYSTEM

(71) Applicant: National Institute of Information and Communications Technology, Tokyo (JP)

(72) Inventors: Takuya Kawada, Tokyo (JP); Julien Kloetzer, Tokyo (JP); Kentaro Torisawa, Tokyo (JP)

(73) Assignee: National Institute of Information and Communications Technology, Tokyo (JP)

(*) Notice: Subject to any disclaimer, the term of this patent is extended or adjusted under 35 U.S.C. 154(b) by 30 days.

(21) Appl. No.: 15/553,998

(22) PCT Filed: Feb. 9, 2016

(86) PCT No.: PCT/JP2016/053750
§ 371 (c)(1),
(2) Date: Aug. 27, 2017

(87) PCT Pub. No.: WO2016/143449
PCT Pub. Date: Sep. 15, 2016

(65) Prior Publication Data
US 2018/0067922 A1    Mar. 8, 2018

(30) Foreign Application Priority Data

Mar. 6, 2015 (JP) ................................. 2015-044419

(51) Int. Cl.
*G06F 17/27* (2006.01)
*G06F 16/00* (2019.01)
(Continued)

(52) U.S. Cl.
CPC .......... *G06F 17/2775* (2013.01); *G06F 16/00* (2019.01); *G06F 16/3329* (2019.01); *G06F 17/2785* (2013.01)

(58) Field of Classification Search
CPC ............... G06F 17/289; G06F 17/2785; G06F 17/30864
See application file for complete search history.

(56) References Cited

U.S. PATENT DOCUMENTS 6,735,622 B1 * 5/2004 Andreoli ............. G06F 15/0225
                                                  707/999.004
9,904,677 B2 * 2/2018 Hamada .................. G06F 17/27
(Continued)

OTHER PUBLICATIONS

"Generation of entailment pattern pairs with consideration to tense and modality", The Association for Natural Language Processing 20th Yearly Conference Proceedings, Mar. 18, 2014. (Year: 2014).*

(Continued)

*Primary Examiner* — Anne L Thomas-Homescu
(74) *Attorney, Agent, or Firm* — Renner, Otto, Boisselle & Sklar, LLP

(57) ABSTRACT

An entailment pattern pair extension apparatus 50 extends entailment pairs by generating an n-term entailment pair from an m-term entailment pair, where m and n are integers not smaller than 0 and satisfying m<n. Each entailment pair includes a first language pattern and a second language pattern entailed by the first language pattern. Entailment pattern pair extension apparatus 50 includes: a generation rule storage unit 110 storing generation rules for generating n-term entailment pairs from m-term entailment pairs, and a binary pair adding unit 112 receiving m-term entailment pair, determining, for each generation rule stored in the generation rule storage unit 110, whether its condition is satisfied by the m-term pair, and if the condition is satisfied,
(Continued)

applying a modification rule of the generation rule to each language pattern constituting the m-term entailment pair.

6 Claims, 8 Drawing Sheets

(51) Int. Cl.
    *G06F 16/33*     (2019.01)
    *G06F 16/332*     (2019.01)

(56) References Cited

U.S. PATENT DOCUMENTS

| | | | | |
|---|---|---|---|---|
| 2009/0287678 | A1* | 11/2009 | Brown | G06F 17/30654 |
| 2009/0292687 | A1* | 11/2009 | Fan | G06F 17/30654 |
| 2011/0276322 | A1* | 11/2011 | Sandor | G06F 17/2785 704/9 |
| 2011/0320187 | A1* | 12/2011 | Motik | G06F 17/278 704/9 |
| 2012/0016912 | A1* | 1/2012 | Schaefer | G06F 17/30421 707/803 |
| 2012/0158628 | A1* | 6/2012 | Junker | G06F 19/00 706/14 |
| 2013/0103390 | A1* | 4/2013 | Fujita | G06F 17/2765 704/9 |
| 2013/0204611 | A1* | 8/2013 | Tsuchida | G06F 17/3069 704/9 |
| 2014/0372102 | A1* | 12/2014 | Hagege | G06F 17/278 704/9 |
| 2015/0006157 | A1* | 1/2015 | Andrade Silva | G06F 17/277 704/9 |
| 2015/0039296 | A1* | 2/2015 | Hashimoto | G06F 17/2785 704/9 |
| 2015/0199339 | A1* | 7/2015 | Mirkin | G06F 17/289 704/2 |
| 2015/0261743 | A1* | 9/2015 | Sengupta | G06F 17/2775 704/9 |
| 2015/0324456 | A1* | 11/2015 | Kim | G06F 17/30654 707/722 |
| 2016/0085743 | A1* | 3/2016 | Haley | G06F 17/28 704/9 |
| 2016/0125013 | A1* | 5/2016 | Barborak | G06F 17/3053 707/748 |
| 2016/0180217 | A1* | 6/2016 | Boston | G06F 17/3053 706/46 |
| 2016/0260026 | A1* | 9/2016 | Kloetzer | G06N 5/047 |
| 2016/0299881 | A1* | 10/2016 | Gupta | G06F 17/24 |
| 2016/0321244 | A1* | 11/2016 | Hashimoto | G06F 17/2785 |
| 2016/0328657 | A1* | 11/2016 | Hashimoto | G06F 17/2785 |
| 2016/0357854 | A1* | 12/2016 | Hashimoto | G06F 17/2785 |
| 2017/0046139 | A1* | 2/2017 | Yi | G06F 8/427 |
| 2017/0124066 | A1* | 5/2017 | Tsuchida | G06F 17/21 |
| 2017/0193085 | A1* | 7/2017 | Boguraev | G06F 17/30684 |
| 2017/0193088 | A1* | 7/2017 | Boguraev | G06F 17/30684 |
| 2018/0218253 | A1* | 8/2018 | Sen | G06F 19/326 |

OTHER PUBLICATIONS

"Automatic expansion of verb-entailment relationship databases", The Association for Natural Language Processing 16th Yearly Conference Proceedings, Mar. 8, 2010. (Year: 2010).*

"A Disaster Information Analysis System Based on Question Answering", Journal of Natural Language Processing, Jun. 14, 2013, vol. 20, No. 3. (Year: 2013).*

International Search report for corresponding International Application No. PCT/JP2016/053750 dated Apr. 26, 2016.

Julien Kloetzer et al., "Large-scale acquisition of entailment pattern pairs", Information Processing Society of Japan Kansai Branch Convention 2013 (2013) (Discussed in Specification).

Ryu Iida et al., "A Cross-Lingual ILP Solution to Zero Anaphora Resolution", Proceedings of the 49th Annual Meeting of the Association for Computational Linguistics, pp. 804-813, Portland, Oregon, Jun. 19-24, 2011. ©2011 Association for Computational Linguistics.

Abstract of Jun Goto et al., "A Disaster Information Analysis System Based on Question Answering", Journal of Natural Language Processing, Jun. 14, 2013 (Jun. 14, 2013), vol. 20, No. 3, pp. 367-404.

Takuyua Kawada et ai, "Jisei Modality o Koryo shita Gan'i Pattern Pair no Seisei", The Association for Natural Language Processing Dai 20 Kai Nenji Taikai Happyo Robunshu [online], Mar. 18, 2014 (Mar. 18, 2014), pp. 562-265 (with machine translation).

Chikara Hashimoto et al., "Doshi Gan'i Kankei Database no Jido Kakucho", The Association for Natural Language Processing Dai 16 Kai Nenji Taikai Happyo Robunshu, Mar. 8, 2010 (Mar. 8, 2010), pp. 940-943 (with machine translation).

Extended European Search Report for corresponding European Application No. 16761421.3 dated Oct. 25, 2018.

Jonathan Berant et al: "Global Learning of Typed Entailment Rules", Proceedings of the 49th Annual Meeting of the Association for Computational Linguistics, Jun. 19, 2011 (Jun. 19, 2011), pp. 610-619, XP055516688, Portland, Oregon, USA "Abstract", "Section 1".

Idan Szpektor et al: "Learning Entailment Rules for Unary Templates", Proceeding of the 22nd International Conference on Computational Linguistics, Coling '08, Association for Computational Linguistics, Morristown, NJ, USA, Aug. 18, 2008 (Aug. 18, 2008), pp. 849-856, XP058104476, ISBN: 978-1-905593-44-6 "Abstract", "Section 1 and 3".

Chikara Hashimoto et al: "Large-scale Verb Entailment Acquisition from the Web", Empirical Methods in Natural Language Processing, Association for Computational Linguistics, N. Eight Street, Stroudsburg, PA, 18360 07960-1961 USA, Aug. 6, 2009 (Aug. 6, 2009), pp. 1172-1181, XP058123724, ISBN: 978-1-932432-63-3 "Abstract","Section 1 and 3".

Julien Kloetzer et al: "Two-stage Method for Large-scale Acquisition of Contradiction Pattern Pairs using Entailment", Proceedings of the 2013 Conference on Empirical Methods in Natural Language Processing, Oct. 18, 2013 (Oct. 18, 2013), pp. 693-703, XP055516705, Seattle, Washington, USA" Abstract" "Section 1, 2 and 6".

Idan Szpector et al: "Augmenting WordNet-based Inference with Argument Mapping", Applied Textual inference, Association for Computational Linguistics, N. Eight Street, Stroudsburg, PA, 18360 07960-1961 USA, Aug. 6, 2009 (Aug. 6, 2009), pp. 27-35, XP058135319, ISBN: 978-1-932432-48-0, "Abstract", "Section 2 and 3".

* cited by examiner

ENTAILMENT PAIR EXTENSION APPARATUS, COMPUTER PROGRAM THEREFOR AND QUESTION-ANSWERING SYSTEM

TECHNICAL FIELD

The present invention relates to natural language processing and, more specifically, to a technique of efficiently generating pairs of two language patterns in which one pattern entails the other pattern.

BACKGROUND ART

In a question-answering system, when a question such as "What causes lung cancer?" is given, an answer such as "Pollution causes lung cancer" is returned as a typical answer, since these two sentences commonly have the expression "cause(s) (lung cancer)." An appropriate answer, however, is not limited to such a sentence that has an expression common to the question. By way of example, an expression "Smoking leads to lung cancer" may be also an appropriate answer. In order to obtain such an answer, one must have the knowledge that "A cause(s) B" is exchangeable with "A lead(s) to B." Here, A and B are variables that can be replaced by any words.

In the present specification, types that are commonly found in a plurality of expressions will be referred to as language patterns or simply patterns. Specifically, in the present specification, an expression consisting of a combination of a verb phrase and n (n is an integer not smaller than 0) terms will be referred to as an n-term language pattern. "A cause(s) B" is a 2-term language pattern consisting of a combination of a verb phrase "cause(s)" and two terms, that is, variable terms A and B.

If two language patterns (pattern pair) have an entailment relation, in the present specification, such a pattern pair is referred to as an entailment pattern pair (or simply "entailment pair"). In a question-answering system, it is desirable to collect a large number of entailment pairs with high precision.

Non-Patent Literature 1 specified below describes a conventional technique of collecting entailment pairs. According to Non-Patent Literature 1, pattern pairs having entailment relations are collected in the following manner. First, pattern pairs known to have entailment relations are manually collected to build training data. Using the training data, a determiner that determines, when two language patterns are given, whether one entails the other, is trained using scores of N-gram, distributional similarity or the like as features. When learning of the determiner is complete, a huge number of entailment pair candidates are generated at random from a corpus including a large number of sentences. Each candidate is subjected to determination by the determiner. Pattern pairs determined to have entailment relations are collected and, thus, new entailment pairs not existing in the training data can be collected.

CITATION LIST

Non Patent Literature

NPL 1: Large-scale acquisition of entailment pattern pairs, Julien Kloetzer, Kentaro Torisawa, Stijn De Saeger, Motoki Sano, Chikara Hashimoto, Jun Gotoh. Information Processing Society of Japan Kansai Branch Convention 2013 (2013)

SUMMARY OF INVENTION

Technical Problem

By the conventional technique, it is possible to collect a huge number of entailment pairs without human labor. When a machine-trained determiner is used, however, it is impossible to predict what specific pairs would be obtained, and precision is not guaranteed. This leads to a difficulty encountered in developing a question-answering system when necessary paraphrasing pattern pairs (entailment pairs) are not exhaustively covered.

Therefore, an object of the present invention is to provide an entailment pair extension apparatus that extends existing entailment pairs while allowing prediction of what entailment pairs will be obtained and ensuring fairly high precision.

Solution to Problem

According to a first aspect, the present invention provides an entailment pair extension apparatus for extending entailment pairs by generating n-term entailment pairs from m-term entailment pairs. Here, m and n are integers not smaller than 0 and satisfying m<n. Each of the entailment pairs includes a pair of a first language pattern and a second language pattern entailed by the first language pattern. The entailment pair extension apparatus includes: generation rule storage means for storing generation rules for generating the n-term entailment pairs from the m-term entailment pairs. The generation rules define a condition to be satisfied by the m-term entailment pair for applying the generation rules, and defining a language pattern modification rule including addition of n-m variables for each of the language patterns constituting the m-term entailment pair if the condition is satisfied. The entailment pair extension apparatus further includes: determining means, receiving the m-term entailment pair and determining, for each of the generation rules stored in the generation rule storage means, whether or not the m-term entailment pair satisfies the condition of the generation rule; and rule applying means for applying the modification rule of the generation rule of which condition is determined to be satisfied by the determining means, to each language pattern constituting the m-term entailment pair, and thereby generating the n-term entailment pair.

Preferably, m is 0, and the m-term entailment pair is an entailment pair of verb phrases, each consisting of a verb phrase.

More preferably, n is 1.

The entailment pair extension apparatus may further include: transitivity applying means for applying transitivity to the m-term entailment pair and thereby for extending the m-term entailment pair.

Preferably, the entailment pair extension apparatus further includes transitivity applying means for applying transitivity to an n-term entailment pair generated by the rule applying means, and thereby for extending the n-term entailment pair.

According to a second aspect, the present invention provides a computer program causing a computer to function as all means of any of the above-described entailment pair extension apparatuses.

According to a third aspect, the present invention provides a question-answering system, including: entailment pair storage means for storing entailment pairs extended by any of the above-described entailment pair expansion apparatus; document storage means for storing a plurality of documents; pattern extracting means, receiving a question and, by performing syntactic analysis of the question, for extracting a language pattern that an answer to the question should have; pattern extension means for extending each of the language patterns extracted by the pattern extracting means, by using the entailment pairs stored in the entailment pair storage means; searching means for searching for and retrieving an expression matching the language pattern extended by the pattern extension means, from documents stored in the document storage means, and for calculating a score indicating aptness as an answer to the question; and selecting means, for selecting an answer using the score, from answer candidates retrieved by the searching means, giving priority to a candidate having larger number of variables in the language pattern that matched during the search.

DESCRIPTION OF EMBODIMENTS

Figure 1:
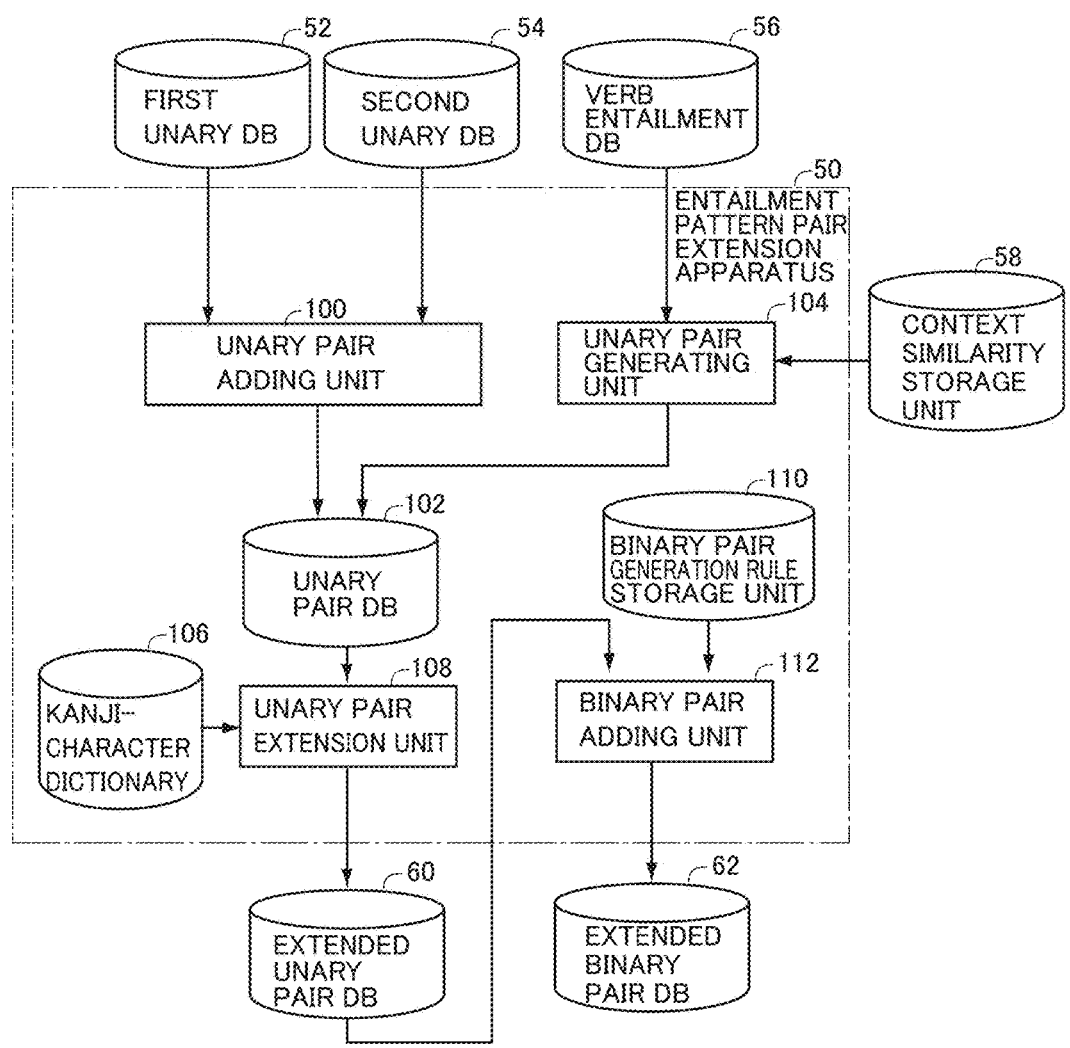
FIG. 1 is a block diagram of an entailment pair extension apparatus in accordance with a first embodiment of the present invention.

In the following description and in the drawings, the same components are denoted by the same reference characters. Therefore, detailed description thereof will not be repeated.

[Word Definitions]

In the present specification, a "unary pattern" refers to a pattern consisting of one variable and a verb phrase and, in the case of Japanese, a particle connecting these. Examples are the expressions "cause(s) A" and "lead(s) to A" mentioned above.

A "unary entailment pattern pair" refers to two unary patterns having such a semantic relation that one entails the other. One example is a pair of "cause(s) A" and "lead(s) to A" above. It is also simply referred to as "unary pair."

A "binary pattern" refers to a pattern consisting of two variables and a verb phrase and, in the case of Japanese, particles connecting these. Examples include "A cause(s) B" and "A lead(s) to B."

A "binary entailment pattern pair" refers to two binary patterns having such a semantic relation that one entails the other. One example is a pair of "A cause(s) B" and "A lead(s) to B." It is also simply referred to as "binary pair."

An "N-ary pattern" generally refers to a pattern consisting of N-term variables, a verb phrase or phrases and a particle or particles connecting these. N-ary entailment pattern pair (referred to as "N-ary pair") refers to a pair of N-ary patterns in which one entails the other.

[First Embodiment]

<Basic Concept>

In the first embodiment, unary pairs are generated from an existing verb entailment database (DB) describing entailment relations between verbs. To the unary pairs obtained in this manner, unary pairs generated from existing unary pattern DB are further added. The resulting plurality of unary pairs are further extended by a method summarized below. Details will be described later.

(1) Verb phrases are modified into passive voice.
(2) Verb phrases are modified into potentials.

These modifications may be done to only one, only the other or both of each pair.

Further, each unary forming each pair is subjected to the modification above, and each unary is combined with the results of modification, whereby new unary pairs are generated.

Then, the unary pairs are extended by using the transitivity. Specifically, when there are two unary pairs P→Q and Q→R, P→R is generated.

Finally, for each of the extended unary pairs, a new term is added to both patterns, whereby the pair is extended to binary. A new term may be added such that the original unary pattern becomes its verb phrase, or such that the original unary pattern becomes an adnominal clause. An example of the former may include modification of "lead(s) to A" into "A lead(s) to B" by adding "A" at the head. An example of the latter may include modification of "lead(s) to A" into an adnominal clause of "B leading to A" by adding B at the head. Details will be described later.

<Configuration>

FIG. 1 is a block diagram of entailment pattern pair extension apparatus 50 in accordance with the first embodiment of the present invention. Referring to FIG. 1, entailment pattern pair extension apparatus 50 is for outputting extended unary pair DB 60 and extended binary pair DB 62, by using first unary DB 52, second unary DB 54, verb entailment DB 56 and context similarity storage unit 58.

The first unary DB 52 and second unary DB 54 are both database storing existing unary pairs. These may be obtained in any manner. They may be created manually, or may be mechanically generated by some process or other. Though first unary DB 52 and second unary DB 54 are used as unary DB in the present embodiment, the number of these is not limited. One DB or three or more DBs may be used. If unary pairs are to be generated by using verb entailment DB 56, unary DB may not be used at all.

Verb entailment DB 56 stores a plurality of verb pairs having entailment relations. An example of verb entailment pair is "lead to→cause" pair. In the present embodiment, verb entailment data (http://alaginrc.nict.go.jp/) manually built by the applicant was used. The verb entailment DB 56 stores 52,689 verb entailment pairs.

Data stored in context similarity storage unit 58 is for calculating context similarity between two words. In short, the context similarity indicates how similar the positions where the two words appear in the sentences are. The context similarity is calculated by using degree of co-occurrence of two words, and obtained by the following method.

A degree of co-occurrence $f_{ij}$ between a word $v_i$ and each word $v_j$ of its context is calculated. The context words of a word $v_i$ refers to all the words that appear in the context where the word $v_i$ appears. The scope of context may be determined as appropriate. For example, it may be a sentence in which the word appears, a few sentences before and after the sentence, or sentences in the same paragraph. When degrees $f_{ij}$ of co-occurrence obtained by this process are aligned in accordance with the order of context words $v_j$, a vector is obtained. This vector is considered to be a context vector with respect to the word $v_i$. Here the context vector of word $v_i$ is denoted as $f_i^*$. The vector $f_i^*$ is a vector consisting of all values corresponding to the word $v_i$ and the respective context words thereof, in the degree of co-occurrence $f_{ij}$. For every combination of words $v_i$ and $v_j$ in a set V of all words, cosine similarity of vectors $f_i^*$ and $f_j^*$ is calculated, of which value is used as the context similarity $\omega_{ij}$.

Context similarity storage unit 58 stores context similarity of any two words, calculated by the method described above in advance.

Entailment pattern pair extension apparatus 50 includes: a unary pair adding unit 100 for modifying unary pairs stored in the first unary DB 52 and the second unary DB 54 into a format handled in entailment pattern pair extension apparatus 50, adding an identifier of each unary DB as a value indicating data source of each unary pair, and outputting the resulting unary pairs; unary pair DB 102 for storing unary pairs output from unary pair adding unit 100; and a unary pair generating unit 104 for generating, from each of the verb entailment pairs stored in verb entailment DB 56, unary pairs using the context similarity stored in context similarity storage unit 58, and adding the outputs to unary pair DB 102.

Entailment pattern pair extension apparatus 50 further includes: a kanji-character dictionary 106 for storing kanji-characters of words and their readings in a machine-readable format; a unary pair extension unit 108 for performing extension process on each unary pair stored in unary pair DB 102 with reference to kanji-character dictionary 106 and outputting a plurality of unary pairs; a binary pair generation rule storage unit 110 for storing generation rules for generating binary pairs from unary pairs; and a binary pair adding unit 112 for generating binary pairs by applying the generation rules stored in binary pair generation rule storage unit 110 to each unary pair stored in extended unary pair DB 60, and outputting results to extended binary pair DB 62.

Figure 2:
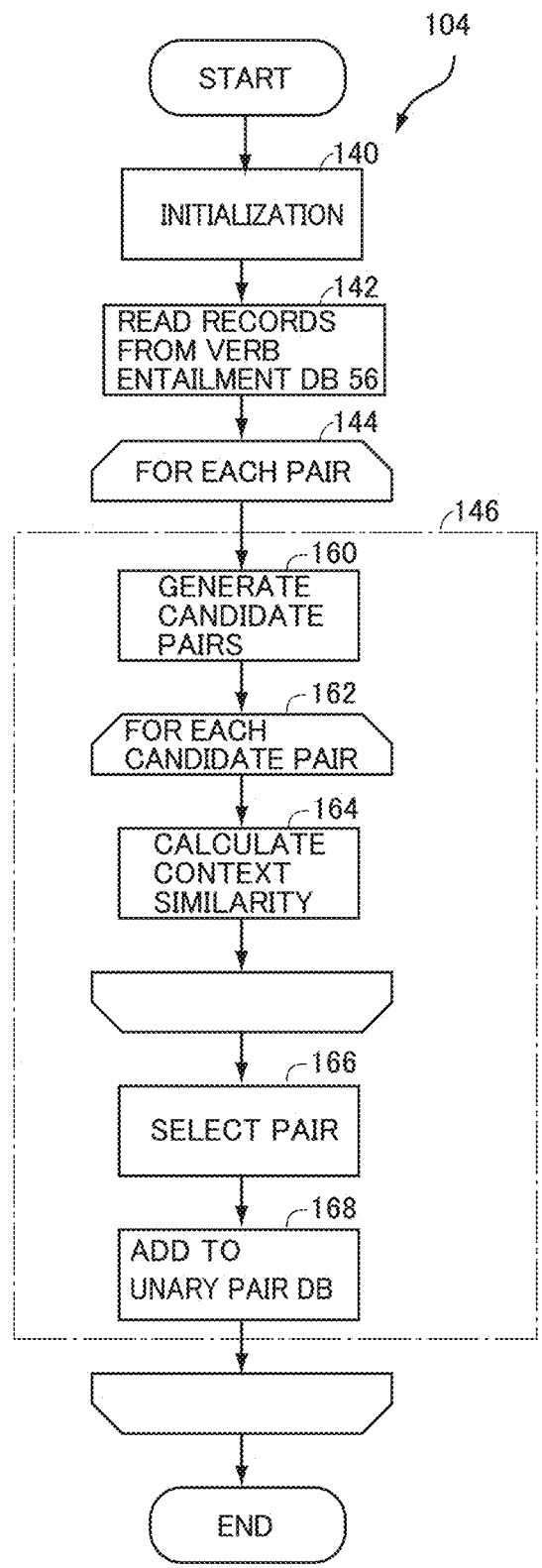
FIG. 2 is a flowchart showing a control structure of a program realizing a unary pair generating unit shown in FIG. 1.

Referring to FIG. 2, unary pair generating unit 104 shown in FIG. 1 can be implemented by a computer program. The program includes: a step 140 of allocating memory area and performing initialization at the start of the program; a step 142 of reading all verb entailment pairs from verb entailment DB 56; and a step 144 of executing a process 146 on each of the verb entailment pairs.

The process 146 includes: a step 160 of adding, to each verb forming the verb entailment pair as an object of processing, 「A が」 (A-subject case particle), 「A に」 (A-object case particle), 「A を」 (A-direct object case particle) and 「A で」 (by A), respectively, to generate a plurality of unary entailment pattern candidate pairs; a step 162 of performing calculation process 164 of calculating, on each of the thus obtained candidate pairs, context similarity between patterns of each pair; a step 166 of selecting a pair having the highest context similarity; and a step 168 of adding the selected pair as a new unary pair to unary pair DB 102. For each pattern pair obtained in this manner, it is desirable for a human to check its relevance as an entailment pair, and to remove it if irrelevant. Here, it is more preferable to store such a pair to be removed as a negative example, in order to remove inappropriate pattern pairs from pattern pairs obtained by the subsequent process. Though not specifically described in each of the process steps described in the following, when a new unary pair or a new binary pair is to be registered, it should be compared with negative examples stored in advance in this manner or compared with negative examples prepared in advance, so as not to register negative ones.

Figure 3:
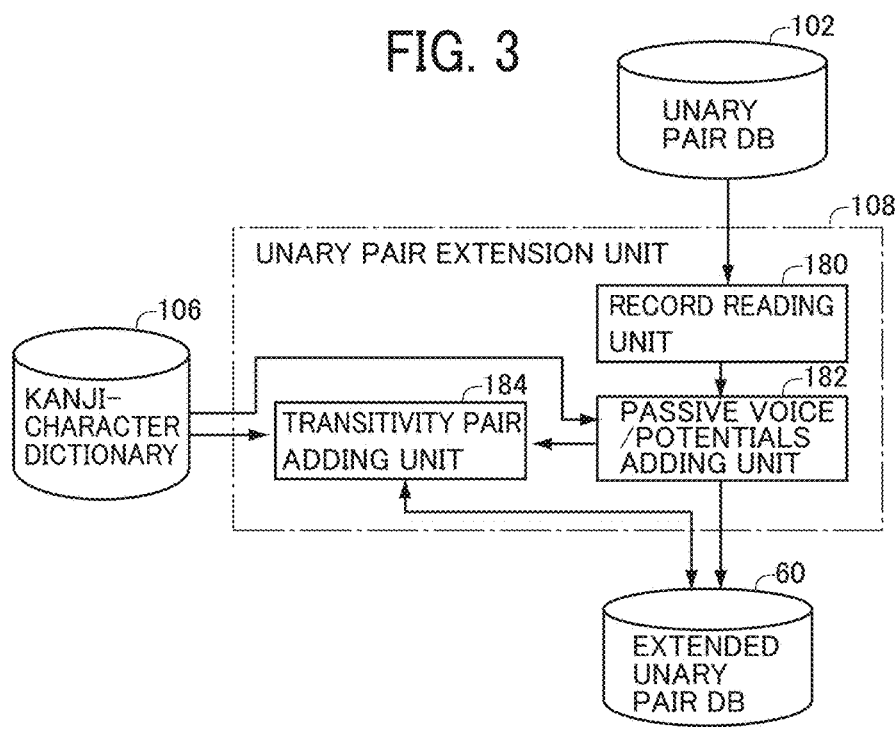
FIG. 3 is a block diagram of a unary pair extension unit shown in FIG. 1.

Referring to FIG. 3, unary pair extension unit 108 shown in FIG. 1 can be implemented by a computer program. The program causes a computer to function as: a record reading unit 180 for reading unary pair records from unary pair DB 102; a passive voice/potentials adding unit 182 for performing modification to passive voice and modification to potential of each pattern forming a pair, on each unary pair read by record reading unit 180, and adding new unary pairs obtained by combining the modified patterns together with the original unary pairs to extended unary pair DB 60; and a transitivity pair adding unit 184 for searching, after addition of unary pairs to extended unary pair DB 60 by passive voice/potentials adding unit 182 is completed, for and retrieving such a combination of unary pairs stored in extended unary pair DB 60 that has a first unary pair of which latter half matches a former half of a second unary pair, for each such combination, for forming a new unary pair by combining the former half of the first unary pair with the latter half of the second unary pair, and for adding the result to extended unary pair DB 60.

In the present embodiment, before the process by passive voice/potentials adding unit 182, spelling variations and variations of termination of verb phrases are applied to each unary pair to further extend the unary pairs. As an approach to address spelling variations, patterns are formed by converting verb phrases written in kanji-characters to kana-characters with reference to kanji-character dictionary 106, and unary pairs having such new patterns are added. Here, unary pairs involving 「漢字→かな」 (kanji-characters→kana characters) and 「かな→漢字」 (kana-characters→kanji-characters) such as [A が起きる→A がおきる] ("A occur(s)" written in kanji-characters→"A occur(s)" written in kana-characters) and [A がお きる→A が起きる] ("A occur(s)" written in kana-characters→"A occur(s)" written in kanji-characters) are simultaneously generated and added to extended unary pair DB 60. Strictly speaking, such pairs do not have "entailment" relations. Presence of such pairs, however, is considered to be helpful in the context of "paraphrasing" in question-answering.

Figure 4:
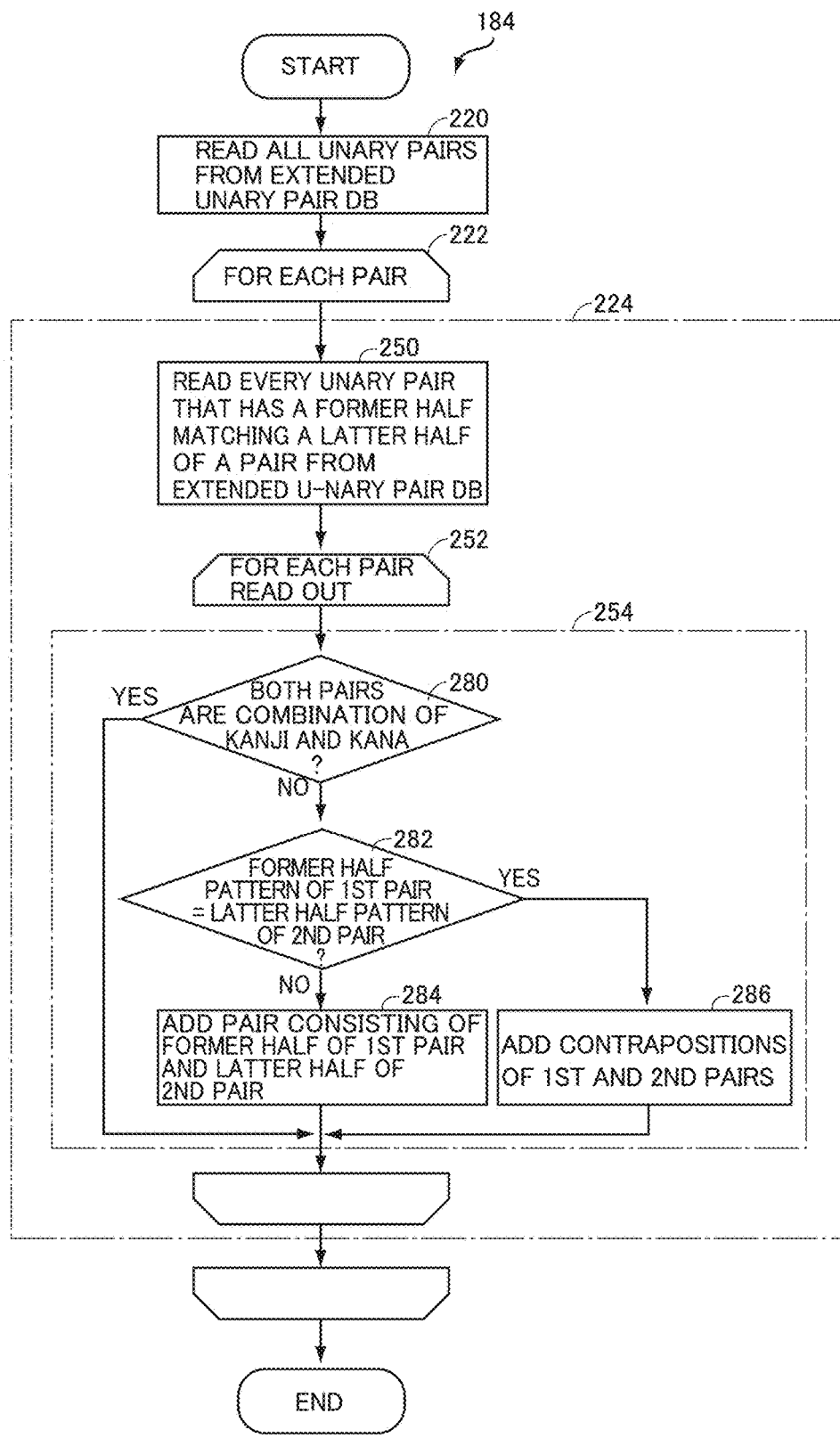
FIG. 4 is a flowchart showing a control structure of a program realizing a transitivity pair adding unit, in the unary pair extension unit shown in FIG. 3.

Transitivity pair adding unit 184 is realized by a computer program. FIG. 4 shows, in the form of a flowchart, a control structure of such a computer program. The program includes: a step 220 of reading all unary pairs from extended unary pair DB 60; and a step 222 of executing a process 224 on each of the read unary pairs.

Process 224 includes: a step 250 of reading every unary pair that has a former half matching a latter half of a unary pair being processed from extended unary pair DB 60; and a step 252 of executing a process 254 on each of the unary pairs read at step 250. In the following, for convenience of description, the pair selected to be processed at step 222 will be referred to as the first unary pair, and a pair selected to be processed at step 252 will be referred to as the second unary pair.

The process 254 includes: a step 280 of determining whether the verb phrase of the first unary pair consists of a combination of "kanji-characters→kana characters" and the verb phrase of the second unary pair consists of a combination of kana-characters→kanji-characters), and if the result of determination is positive, terminating the process and proceeding to a next second unary pair; a step 282, executed if the result of determination at step 280 is negative, of determining whether the former half of the first unary pair matches the latter half of the second unary pair; a step 284, executed if the determination at step 282 is NO, of forming a new unary pair consisting of the former half of the first unary pair and the latter half of the second unary pair and adding it to extended unary pair DB 60; and a step 286, executed if the determination at step 282 is positive, of adding a contrapositive pair of each of the first and second unary pair to extended unary pair DB 60.

As a result of the process at step 284, from a pair P→Q and another pair Q→R, a pair P→R is generated by the so-called transitivity, and it is added to extended unary pair DB 60.

The process at step 286 is not based on the transitivity. The process of step 286 takes place if the latter half of the first unary pair is the same as the former half of the second unary pair and the former half of the first unary pair is the same as the latter half of the second unary pair. Specifically, the first unary pair and the second unary pair are reverse to each other. In other words, there are both P→Q and Q→P. That the two unary pairs both exist means that a relation similar to "equivalence" exists between these two unary pairs. Therefore, in the present embodiment, for both of these two unary pairs, unary pairs that constitute logical "contraposition" is generated and they are added to extended unary pair DB 60. Specifically, for P→Q, a unary pair¬Q→¬P ("¬" represents negation) is added and for the unary pair Q→P, a unary pair¬P→¬Q is added.

Generally, if a proposition is true, its contraposition is also true. Therefore, if there is a unary pair P→Q, it does not seem to pose any problem if its contraposition ¬Q→¬P is added unconditionally. The present embodiment addresses natural language and, hence, even if there is a unary pattern, its contraposition is not always true. Therefore, here, only when two unary pairs are equivalent, their contrapositions are added.

Figure 5:
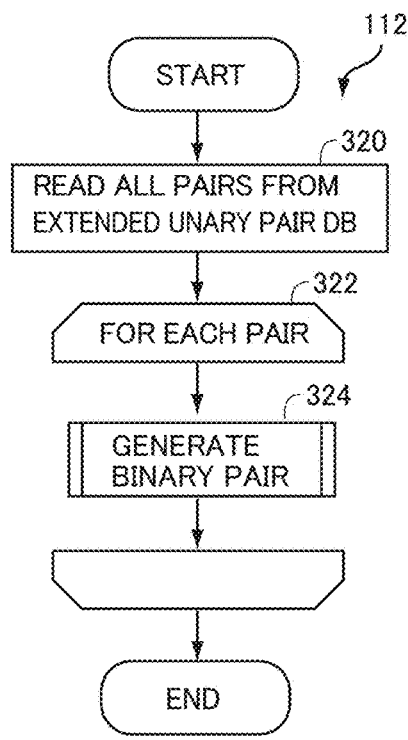
FIG. 5 is a flowchart showing a control structure of a program realizing the binary pair adding unit shown in FIG. 1.

Referring to FIG. 5, in the present embodiment, binary pair adding unit 112 shown in FIG. 1 is also realized by a computer program. The program includes: a step 320 of reading all unary pairs from extended unary pair DB 60; and a step 322 of executing, on each of the read unary pairs, a process 324 of generating binary pair from the unary pair.

Figure 6:
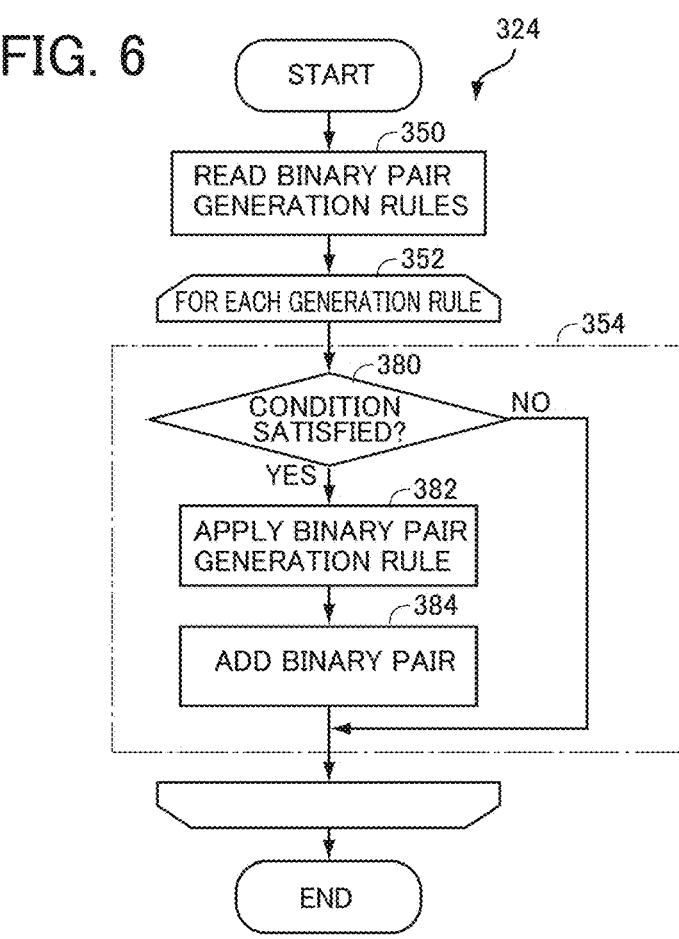
FIG. 6 is a flowchart showing details of binary pair generating process shown in FIG. 5.

Referring to FIG. 6, the program realizing the process 324 in FIG. 5 includes: a step 350 of reading all binary pair generation rules from binary pair generation rule storage unit 110 shown in FIG. 1; and a step 352 of executing, on a unary pair to be processed, a process 354 of applying each of the generation rules read at step 350, thereby generating binary pairs, and adding the generated binary pairs to extended binary pair DB 62. Here, each binary generation rule consists of a condition to be satisfied by the unary pair when the binary rule is to be applied to the unary pair, and an instruction part describing, if the condition is satisfied, how the pair of patterns forming the unary pair is to be modified into generate a binary pair. The instruction part is actually a description of sentence modification rule.

The process 354 includes: a step 380 of determining whether the condition of the binary pair generation rule to be processed is satisfied by a unary pair being processed, and terminating application of the rule if the condition is not satisfied; a step 382, executed if the determination at step 380 is positive, of applying the binary pair generation rule selected at step 352 in FIG. 6 to the unary pair selected at step 322 in FIG. 5, and thereby generating a binary pair; and a step 384 of adding the binary pair generated at step 382 to extended binary pair DB 62 and terminating application of the binary pair generation rule.

The binary pair generation rules stored in binary pair generation rule storage unit 110 are each described in the If-Then format. A binary pair generation rule is described such that when it is applied to one unary pair, one binary pair is generated.

In the present embodiment, the principal binary pair generation rules are as follows.

(1) If the particle of a unary pair is not 「が」 (case particle for subject), 「A が」 (A as a subject) is added to both patterns forming the unary pair. As a result, from a unary pair 「A を使う→A を用いる」 ("use A"→"utilize A"), a binary pair 「A が B を使う→A が B を用いる」 ("A use(s) B"→"A utilize(s) B") is generated. Here, the variable represented by "A" before applying the rule is denoted as "B" simply for easier understanding of the form of binary pair, and the variable represented by "A" is not changed to another variable. The same applies to the following descriptions.

(2) If the particle of unary pair is not 「が」 (case particle for subject), 「A が」 (A as a subject) is added to the former half pattern of the unary pair, 「A が」 (A as a subject) is added to the head of the latter pattern, 「B を」 (B as an object) is deleted, and 「B を使う」 is added to the tail. For the same example as (1), a binary pair 「A が B を使う→A が用いる B」 ("A use(s) B"→"B utilized by A") is generated.

(3) If the particle of unary pair is not 「が」 (case particle for subject), 「A が」 (A as a subject) is added to the head of former half, and 「A」 is added to the tail of the latter half. For the example above, a binary pair 「A が B を使う→B を用いる A」 ("A use(s) B"→"A utilizing B") is generated.

(4) If the particle of unary pair is not 「が」 (case particle for subject), 「A が」 (A as a subject) is added to the head of former half, 「B を」 (B as an object) is deleted and 「B」 is added to the tail. 「A が」 (A as a subject) is added to the head of latter half. For the example above, a binary pair 「A が B を使う→B を用いる A」 ("A use(s) B"→"A utilize(s) B") is generated.

By applying similar modification rules to the former half, the latter half or both of the unary pairs, new binary pairs are generated.

Regarding the particle as a condition of application, when 「で」 ("by" or "with") is used as the condition in place of 「が」 (case particle for subject), binary pairs can be generated using similar modification rules.

Here again, unary pair is formed by combining the same unary patterns, and binary pairs are formed by performing the same operations as above. By way of example, from a pattern 「A を使う」 ("use(s) A"), a binary pattern 「A が B を使う→B を使う A」 ("A use(s) B"→"A using B") is generated and stored in extended binary pair DB 62.

In the present embodiment, the binary pair generation rules are provided as data outside the program. The present invention, however, is not limited to such an embodiment. The generation rules may be described in the form of a program, and it may be dynamically loaded when the program is executed. Alternatively, the generation rules may be successively described in the form of instructions. When the generation rules are to be read from the outside, individual rules may be prepared in advance as separate files, or the rules as a whole may be collectively put in one file. In any case, each rule is created as a set of a condition part and a modification rule to be applied to each pattern when the condition is satisfied by the unary pair, and it may be prepared in any form. The rules may be in data format or program format, as described above. Alternatively, the rules may be embedded in the form of an algorithm in the program body, or may be saved in a program format as an external file to be read and included from outside at the time of execution.

<Operation>

Referring to FIG. 1, the above-described entailment pattern pair extension apparatus 50 operates in the following manner. Before execution of the following process by entailment pattern pair extension apparatus 50, contents of the first unary DB 52, the second unary DB 54, verb entailment DB 56, context similarity storage unit 58, kanji-character dictionary 106 and binary pair generation rule storage unit 110 must be prepared in advance.

Unary pair adding unit 100 successively reads unary pairs from first unary DB 52 and second unary DB 54, modifies each into a format to be handled in entailment pattern pair extension apparatus 50, adds an identifier of each unary DB as a value indicating data source of each unary pair, and outputs the results to unary pair DB 102.

Unary pair generating unit 104 generates unary pairs in the following manner using the context similarity stored in context similarity storage unit 58, and outputs and adds them to unary pair DB 102. Referring to FIG. 2, unary pair generating unit 104 allocates a memory area and performs initialization as the process starts (step 140). Unary pair generating unit 104 reads all verb entailment pairs from verb entailment DB 56 (step 142). Unary pair generating unit 104 executes the process 146 on each of the read verb entailment pairs (step 144).

In process 146, to each verb constituting the verb entailment pair as the object of processing, unary pair generating unit 104 adds 「A が」 (A-subject case particle), 「A に」 (A-object case particle), 「A を」 (A-direct object particle) and 「A で」 (by A), respectively, to generate a plurality of unary entailment pattern candidate pairs (step 160). Unary pair generating unit 104 performs calculation process 164, on each of the thus obtained candidate pairs, context similarity between patterns of each pair (step 162). Unary pair generating unit 104 selects a pair having the highest context similarity between the patterns forming the unary pair, based on the calculated context similarity (step 166), and adds the pair to unary pair DB 102 as a new unary pair (step 168). Here, as the data source of the new unary pair, an identifier of verb entailment DB 56 is added to the new unary pair and, in addition, an identifier of the verb entailment pair as the original is added. Unary pair generating unit 104 performs such a process on every verb entailment pair read from verb entailment DB 56.

When the addition of unary pairs to unary pair DB 102 by unary pair adding unit 100 and unary pair generating unit 104 is completed, unary pair extension unit 108 generates a plurality of unary pairs from each of the unary pairs stored in unary pair DB 102 and outputs them to extended unary pair DB 60. Specifically, referring to FIG. 3, record reading unit 180 in unary pair extension unit 108 reads unary pair records from unary pair DB 102. For each of the unary pairs read by record reading unit 180, passive voice/potentials adding unit 182 modifies each unary pattern forming the unary pair into a passive voice and into a potential form, and adds a plurality of new unary pairs obtained by combinations thereof to extended unary pair DB 60 together with the original unary pairs. Here, the identifier of the source unary pair of the new unary pair and a flag specifying the applied modification are added to the new unary pair. After the addition of unary pairs by passive voice/potentials adding unit 182 to extended unary pair DB 60 is completed, transitivity pair adding unit 184 further extends the unary pairs by applying to each unary pair the spelling variations and variations of termination of verb phrases. Specifically, by referring to kanji-character dictionary 106, transitivity pair adding unit 184 forms new unary patterns by converting verb phrases written in kanji to kana, and thus adds unary pairs having new patterns. Further, transitivity pair adding unit 184 simultaneously generates "kanji-character→kana-character" and "kana-character→kanji-character" unary pairs, and adds them to extended unary pair DB 60. Thereafter, transitivity pair adding unit 184 searches for and retrieves such a combination of unary pairs stored in extended unary pair DB 60 that has a first unary pair of which latter half matches a former half of a second unary pair. For each combination of the retrieved unary pairs, transitivity pair adding unit 184 generates a new unary pair by combining the former half of the first unary pair and the latter half of the second unary pair, and adds it to extended unary pair DB 60.

Referring to FIG. 4, more specifically, transitivity pair adding unit 184 reads all unary pairs from extended unary pair DB 60 (step 220), and for each read unary pair, executes the process 224 (step 222). Specifically, at step 222, transitivity pair adding unit 184 selects the read unary pairs one by one in a prescribed order, and executes the process 224 in the following manner on the selected unary pair (first unary pair).

In the process 224, transitivity pair adding unit 184 reads all unary pairs that have the former half matching the latter half of the unary pair being processed, from extended unary pair DB 60 (step 250). On each of the unary pairs (second unary pair) read at step 250, transitivity pair adding unit 184 executes the following process 254 (step 252). In the process 254, if the verb phrase of the first unary pair is a combination of "kanji-character→kana-character" and the verb phrase of the second unary pair is a combination of 「かな→漢字」 (kana-character→kanji-character), transitivity pair adding unit 184 ends the process, and the process proceeds to the next second unary pair (positive determination at step 280). If the determination at step 280 is negative, transitivity pair adding unit 184 determines whether or not the former half pattern of the first unary pair matches the latter half pattern of the second unary pair (step 282). If the determination is NO, transitivity pair adding unit 184 forms a new unary pair consisting of the former half of the first unary pair and the latter half of the second unary pair and adds it to extended unary pair DB 60 (step 284). If the determination at step 282 is positive, transitivity pair adding unit 184 adds, for each of the first and second unary pairs, a contrapositive unary pair to extended unary pair DB 60 (step 286).

As a result of the process at step 284, from the pairs P→Q and Q→R, a pair P→R is generated by the so-called transitivity, and it is added to extended unary pair DB 60. In the process at step 286, for the pair P→Q, a pair ¬Q→¬P is added, and for the pair Q→P, a pair ¬P→¬Q is added.

When registration of transitivity pairs by transitivity pair adding unit 184 is completed, extended unary pair DB 60 will be storing the unary pairs from the first unary DB 52, the second unary DB 54 and verb entailment DB 56, and unary pairs extended from the verb entailment pairs accumulated therein, which pairs are ready to be used. It is noted that a unary pair generated in accordance with the transitivity has identifiers of the original two sets of unary pairs as well as a flag indicating that the pair is added in accordance with the transitivity. A unary pair added based on the equivalence relation has identifiers of the original two sets of unary pairs as well as a flag indicating that the pair is added based on equivalence.

Returning to FIG. 1, when accumulation of unary pairs in extended unary pair DB 60 is completed, binary pair adding unit 112 generates a plurality of binary pairs in the following manner for each of the unary pairs stored in extended unary pair DB 60, and stores them in extended binary pair DB 62. Specifically, referring to FIG. 5, binary pair adding unit 112 reads all unary pairs from extended unary pair DB 60 (step 320). Binary pair adding unit 112 selects the read binary pairs one by one successively (step 322), and for each of the pairs, executes the process 324 of generating a binary pair from the unary pair.

Referring to FIG. 6, in the process 324 of FIG. 5, binary pair adding unit 112 reads all binary pair generation rules from binary pair generation rule storage unit 110 shown in FIG. 1 (step 350). Further, for the unary pair selected to be processed, binary pair adding unit 112 successively selects each of the generation rules read out at step 350 (step 352), and executes the process 354. In the process 354, binary pair adding unit 112 determines whether or not the unary pair that is being processed satisfies the condition for application of the binary pair generation rule as the object of processing (step 380). If the condition is not satisfied, application of this rule is terminated and the process proceeds to application of the next generation rule (determination at step 380 is NO). If the determination at step 380 is positive, binary pair adding unit 112 applies the binary pair generation rule being processed, on the unary pair to be processed, and thereby generates a binary pair (step 382). Binary pair adding unit 112 adds the binary pair generated in this manner to extended binary pair DB 62, and ends application of this binary pair generation rule (step 384).

In the present embodiment, from a unary pair [A を使う→A を用いる] ("use A"→"utilize A"), the following binary pairs are generated.

TABLE 1

| | |
|---|---|
| AがBを使う(A use(s) B) | AがBを用いる(A utilize(s) B) |
| AがBを使う(A use(s) B) | Aが用いるB (B utilized by A) |
| AがBを使う(A use(s) B) | Bを用いるA (A utilizing B) |
| Aが使うB (B used by A) | AがBを用いる(A utilize(s) B) |
| Aが使うB (B used by A) | Aが用いるB (B utilized by A) |
| Aが使うB (B used by A) | Bを用いるA (A utilizing B) |
| Bを使うA (A using B) | AがBを用いる(A utilize(s) B) |
| Bを使うA (A using B) | Aが用いるB (B utilized by A) |
| Bを使うA (A using B) | Bを用いるA (A utilizing B) |

Binary pair adding unit 112 applies all the generation rules stored in binary pair generation rule storage unit 110 on every unary pair stored in extended unary pair DB 60 and adds all the generated binary pairs (except for negative examples) to extended binary pair DB 62, whereby binary pairs obtained by extension from the first unary DB 52, the second unary DB 54 and verb entailment DB 56 will be accumulated in extended binary pair DB 62 and become available. Here, each binary pair has an identifier of the unary pair as its source and an identifier of the applied generation rule added as information.

Generally, in a question-answering system, a unary pair is easily hit as an answer to a question. A unary pair, however, has only one term. Therefore, if an answer is to be obtained from unary pairs only, we cannot expect very high precision of the answer. Therefore, when an answer is searched for, binary pairs are used first, and unary pairs are used if search of binary pairs fails. By such a method of searching for answers, it becomes possible to improve the hit rate while maintaining high precision of answers. Here, by improving binary pairs in accordance with the method of the embodiment above, higher precision of answers can be expected.

The unary pairs generated by the above-described method can also be utilized in a question-answering system by the following method. First, frequency of appearance in a corpus of each pattern forming a pair is calculated in advance. In an experiment that will be described later, in a huge number of documents collected from the web, if each pattern hits in a search for an answer, unary pairs are used with priority as paraphrasing patterns in accordance with the following order of priority, taking into account the source and nature of unary pattern data.

(1) Equivalence relation (when P→Q and Q→P are both valid)

(2) Same verb phrase having different reading or voice (potential/passive voice)

(3) Unary pairs other than those above, extended from the first unary DB 52 and the second unary DB 54.

Regardless of the source of data, patterns of which frequency in the documents collected from the web mentioned above is smaller than a certain number are set to have the lowest priority. In the evaluation experiment described below, the number of documents collected from the web was six hundred million, and the threshold value to set the lowest priority was 10.

<Evaluation>

An experiment for evaluating the entailment pairs (unary pairs and binary pairs) in accordance with the first embodiment above will be described. In this experiment, in place of the first unary DB 52 and the second unary DB 54, three sets of unary pairs were used. Of these, the first contained 83,706 unary pairs, built manually from existing unary pairs, by manually checking pairs of which patterns forming each pair have high context similarity. The second set was prepared by selecting, from existing verb phrase pairs, verb phrases having particles 「を」「に」「で」and forming unary pairs. Here, ambiguous examples were manually checked, and only those determined to be positive examples were selected. The second set thus built contained 7,334 unary pairs. The third set contained 27,369 positive examples obtained based on several data prepared by the applicant by that time.

As verb entailment DB 56, verb entailment data (https://alaginrc.nict.go.jp/) built manually by the applicant as described above was used. The verb entailment DB 56 contains 52,689 verb entailment pairs. These pairs were subjected to the process by unary pair generating unit 104, and resulting unary pairs were manually checked and positive examples were accumulated. As a result, 51,589 unary pairs were obtained.

From the foregoing, the number of unary pairs used as seeds for the process was 83,706+7,334+27,369+51,589=169,998.

By the method described in the embodiment above, unary pairs and binary pairs were generated, of which numbers were as follows. First, before applying the transitivity, the number of unary pairs was 901,232, which was more than eight times the original number of unary pairs. By the extension using transitivity, 2,864,415 unary pairs were newly obtained, the number of which is approximately three times the number before applying the transitivity. Further, from the same unary expressions, binary pairs were extended and, eventually, 42,096,327 binary pairs were generated. As compared with the number of original unary pairs, this is approximately 280 times larger.

The pairs generated by the above-described process were scored by heuristics, in the following manner.

$$Score=\alpha-(\alpha-\beta)/(f/1000+1)$$

Here, f represents the sum of frequencies of two unary patterns as a source for generating a certain pair appearing in the six hundred million of web documents. The values $\alpha$ and $\beta$ are given as follows, in accordance with the original unary pattern.

Figure 7:
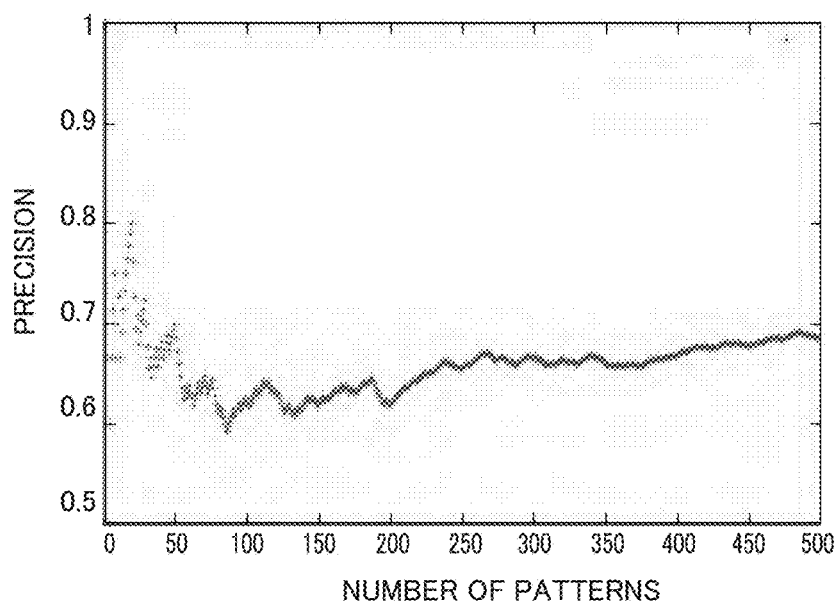
FIG. 7 is a graph showing overall evaluation of unary pairs obtained in an experiment.

For patterns having equivalence relation: $\alpha=2$, $\beta=-0.2$
For patterns extended in accordance with transitivity: $\alpha=-0.2$, $\beta=-0.8$
For other patterns: $\alpha=0.1$, $\beta=-0.3$ FIG. 7 is a graph representing the overall evaluation of unary pairs. This graph shows evaluation of all the unary pairs (3,765,647 pairs) obtained in the extended unary pair DB 60, evaluated in the following manner.

(1) Only those unary pairs were selected which consist of two patterns each appearing 10 times or more in the six hundred million web documents.

(2) From the pairs selected at (1), 500 pairs were selected at random, and whether each pair was positive/negative was evaluated by three annotators. The annotators were different from the inventors of the present invention. The final evaluation was decided by majority vote of evaluation by the three annotators. The kappa coefficient here was a medium level, kappa: 0.46.

(3) The selected 500 samples were sorted and plotted in accordance with products of frequency of appearance of patterns forming each pair.

From this figure, it can be seen that the frequency of appearance of each pattern does not lead to a significant difference.

Further, positive examples of unary pairs extended in accordance with the transitivity and unary pairs extended in other manners were separately evaluated, and the following results were obtained.

TABLE 1

| | Positive Examples (precision) | Total |
|---|---|---|
| Pairs generated by transitivity | 249 (0.64) | 386 |
| Pairs generated otherwise | 94 (0.82) | 114 |
| All pairs | 343 (0.68) | 500 |

Figure 8:
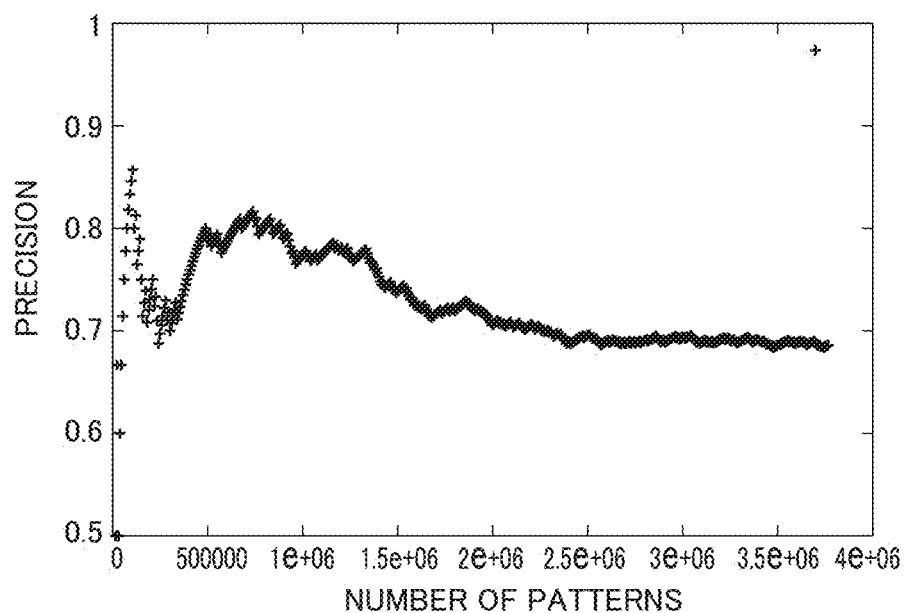
FIG. 8 is a graph showing evaluation of 500 examples of unary pairs obtained in an experiment.

FIG. 8 shows the evaluations of 500 unary pairs sampled at random, sorted in descending order of the priority (score), plotting the precision of upper n-th precisions. The overall precision was approximately 0.68. As shown in Table 1, however, precision exceeding 0.8 could be attained by unary pairs generated by rules other than the transitivity.

Figure 9:
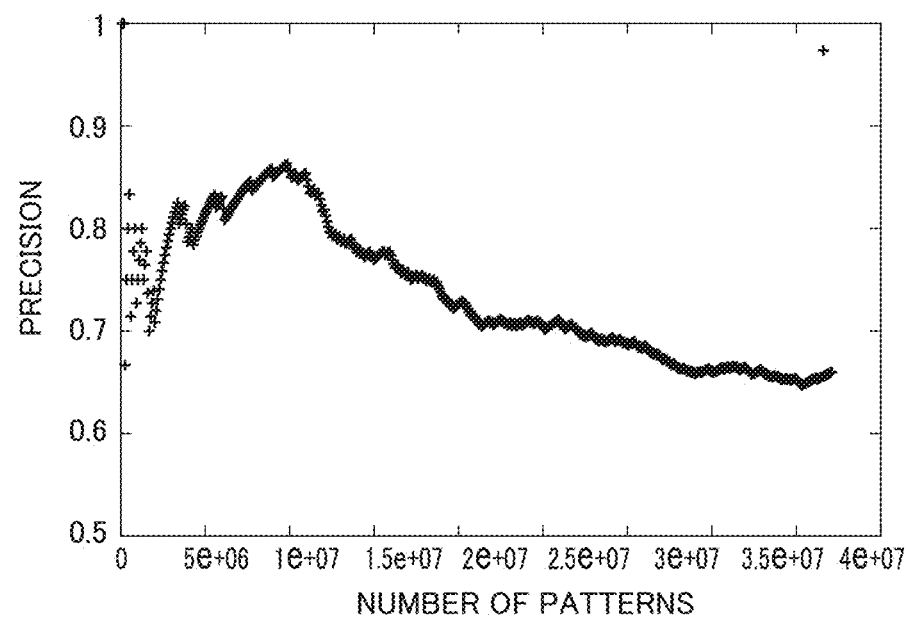
FIG. 9 is a graph showing evaluation of 500 examples of binary entailment pairs obtained in an experiment.

FIG. 9 shows the results of the evaluations of 500 pairs sampled at random from the generated binary pairs (42,096,327 pairs) in a similar manner, sorted and plotted in accordance with their scores. As shown by the graph of FIG. 9, the overall precision was 0.66, which was comparable to that of unary pairs.

From the viewpoint of use for paraphrasing in a question-answering system, the precision of approximately 0.8 could be attained in the highest 30%, or about 12,000,000 pairs, of the binary pairs of about 42,000,000 pairs, and in the highest 20%, or about 750,000 pairs, of the unary pairs of about 3,800,000 unary pairs. With this precision and these numbers, the obtained data could be evaluated as sufficiently practical.

Pairs obtained by machine learning were further added to these pairs, and the resulting total of about 100,000,000 entailment pairs were incorporated as resources for paraphrasing, in a question-answering system formed by the applicant, to which a question "For what do you use big data?" was input. As a result, in addition to well expected answers such as "business" and "marketing," we obtained answers such as "useful for transportation planning" and "there is a great deal of coverage as to how useful big data is for accurate political prediction." To obtain each of these answers, pairs obtained based on the transitivity of [A に役立つ→A に使う] (useful for A→use for A" was used. Further, to a question "What did Nobunaga aim at?" in addition to the common answer "dominating the whole country," answers such as "aspires to absolute monarchy" and "aspires to free economy" were obtained. Regarding these answers, pairs obtained based on the transitivity, specifically, pairs [A が B を目指す→A が B を狙う] (A aspire(s) to B→A aim(s) at B) and [B を目指す A→A が B を狙う] (A aspiring to B→A aim(s) at B) were used for paraphrasing. Thus, it was confirmed that various answers could be extracted by extending entailment pairs using the method of the embodiment above and by using the same for paraphrasing in a question-answering system.

<Modifications>

In the present embodiment, application of transitivity is limited to two stages. The reason for this is that application of three or more stages takes long time. In principle, the transitivity can be applied to any number of stages. For this purpose, the process 224 shown in FIG. 4 may be applied in a nested manner. It is noted, however, that if the number of stages to which the transitivity is applied increases, precision is expected to decrease. Application to three or four stages at most would be practical. Depending on the manner of processing, however, decrease in precision may be prevented even when the transitivity is applied among entailment pairs over a larger number of stages. Such possibility will be subjected to future verification.

In the embodiment above, the transitivity is applied after the unary pairs are extended. In principle, the transitivity may be applied not after extension of unary pair but in the stage of verb entailment pairs, or before extension of unary pairs. When verb entailment pairs are used, however, the new verb entailment pairs obtained by applying the transitivity may include irrelevant pairs due to ambiguity of verbs themselves. Therefore, it would be necessary to check the result after application of transitivity, to remove irrelevant pairs. If the transitivity is applied to unary pairs before extension, such possibility is low. The number of unary pairs newly obtained by the application of transitivity, however, will be smaller than when the transitivity is applied after extension. Therefore, from the viewpoint of obtaining expressions for paraphrasing, such an approach might be disadvantageous as compared with the embodiment above. Even then, the effect of extending unary pairs in a predictable manner can still be attained, different from the conventional examples. Therefore, such embodiments are sufficiently feasible.

Further, in the embodiment above, extension from unary pair to binary pair takes place. The present invention, however, is not limited to such an embodiment. By further adding a term to a binary pair, it can be extended to a three-term pair (ternary pair). An example of ternary pair is [A が B に C を送る] (A send(s) B to C). As to the method of extension, the method using generation rules applied to extension from unary pairs to binary pairs can directly be applied. It is noted, however, that when ternary patterns are to be generated, designation of conditions allowing application of rules becomes more complicated, the resulting ternary pairs come to have wider varieties than binary pairs, and hence, the time necessary for processing becomes longer. Based on the same idea, for a natural number n not smaller than 4, and supposing that m=n−1, m-ary patterns can be extended to obtain N-ary patterns. Practical implementation is limited only by the work load of determining rules and the processing time.

Further, direct extension from unary pairs to ternary pairs is also possible. For this purpose, a rule that adds two terms when a certain condition is satisfied may be added. By mixing and applying rules for forming binary pairs from unary pairs and rules for forming ternary pairs from unary pairs, it becomes possible to simultaneously generate binary pairs and ternary pairs.

As described above, by the present invention, it is possible to generate entailment pairs of complicated language patterns having one or more terms from simple verb entailment pairs, by applying simple rules. According to this method, once necessary verb entailment pairs are prepared, various entailment pairs consisting of various related patterns can be automatically generated. Thus, we can obtain a huge number of entailment pairs that could not be covered by the pairs obtained by machine learning in the conventional approach. As a result, by applying these entailment pairs to paraphrasing in a question-answering system, we can attain the effect that the number of obtained answers significantly increases. We can predict what entailment pairs result by the extension from the original verb entailment pairs. Further, it is guaranteed that the eventually adopted data has a certain precision, as described above. Therefore, as compared with the conventional art, a set of entailment pairs with high precision can more efficiently be collected, which is usable for a system such as a question-answering system that uses natural language.

[Second Embodiment]

By entailment pattern pair extension apparatus 50 of the first embodiment, it is possible to obtain a plurality of DBs such as extended unary pair DB 60 and extended binary pair DB 62. The second embodiment relates to a question answering system that searches for and retrieves an answer to a question from web archive, using such a plurality of DBs. Here, the question-answering system in accordance with the second embodiment is used with up to extended N-ary DB, as a general example, which is a DB storing entailment pairs extended to patterns including variables up to the n-th term. In the following, extended unary pairs, extended binary pairs and general extended N-ary pairs will be collectively referred to as extended pairs, and DBs respectively storing these pairs (extended unary pair DB 60, extended binary pair DB 62 and so on) will be collectively referred to as extended pair DB.

Figure 10:
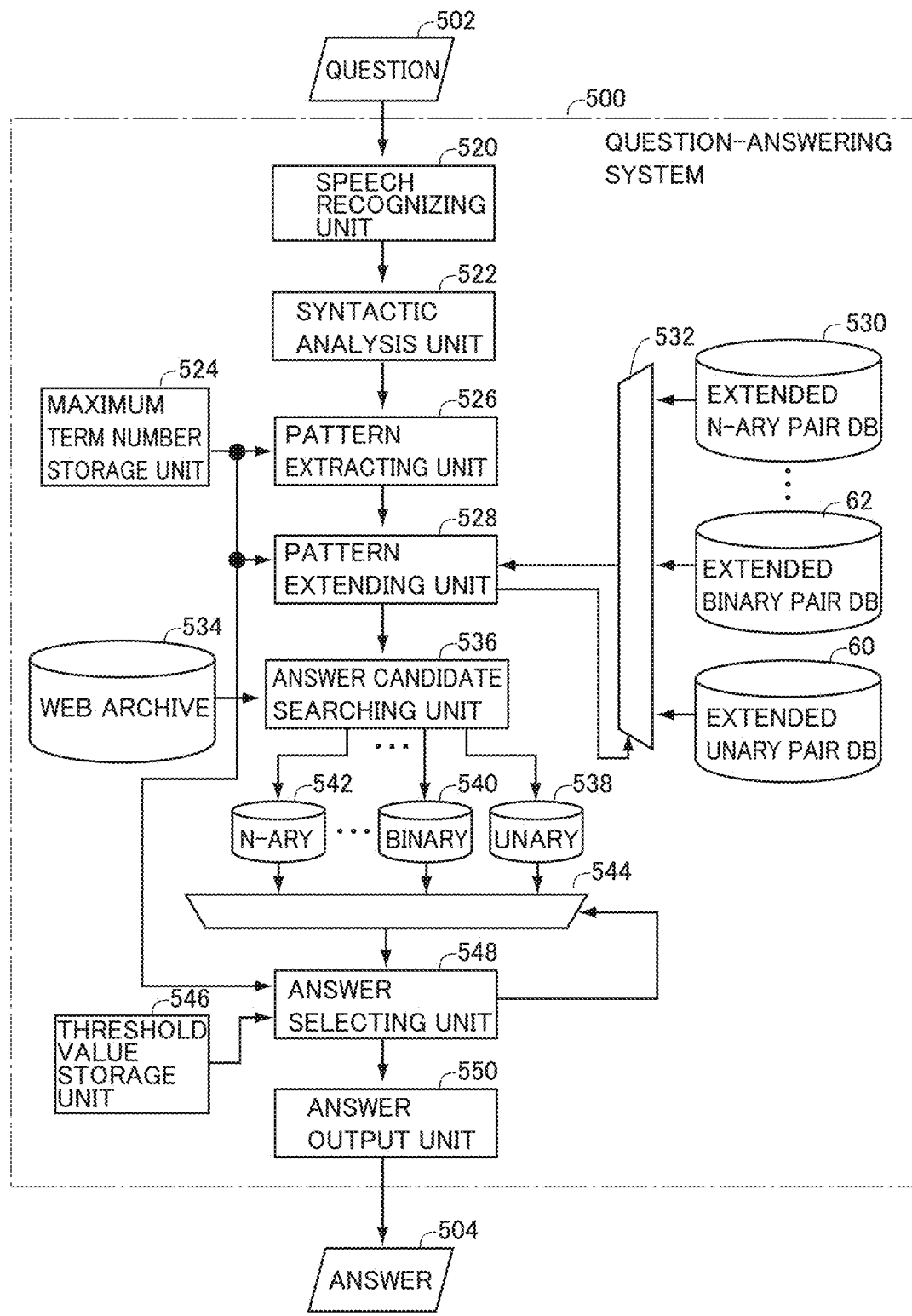
FIG. 10 is a functional block diagram schematically showing a configuration of a question-answering system in accordance with a second embodiment of the present invention.

Referring to FIG. 10, a question-answering system 500 in accordance with the second embodiment receives a question 502 as voice input, and outputs an answer 504 to the question as a voice output. Question 502 may be received by a microphone and a speech processing unit provided in question-answering system 500, or it may be received from another terminal through a network.

A speech recognizing unit 520 performs speech recognition of question 502, and outputs a question sentence as a text having grammatical information added. A syntactic analysis unit 522 applies a syntax converting rule prepared in advance to the question sentence and thereby obtains a positive sentence, further performs dependency parsing and syntactic analysis, and outputs dependency information in the form of a graph, which represents syntactic dependency relation between words. This dependency information is scanned by a pattern extracting unit 526, and extracts a pattern from paths connecting words on the graph. Here, the upper limit of the number of terms of variables included in the pattern is set to N. The maximum number of terms is stored in a maximum term number storage unit 524, and a pattern extracting unit 526 reads this value and extracts patterns including at most N terms of variables from the dependency information. When the number of variables is 1, the pattern is referred to as unary, and 2 as binary, as described above. Generally, a pattern having N variables will be referred to as N-ary pattern. Therefore, the patterns extracted by pattern extracting unit 526 will be unary patterns, binary patterns, . . . N-ary patterns.

More specifically, pattern extracting unit 526 extracts a unary pattern by replacing, in a path connecting a noun and a verb phrase, the noun with a variable. Similarly, pattern extracting unit 526 extracts a binary pattern by replacing, on a path connecting two nouns and a verb phrase, the two nouns with variables, respectively. Similar processing is continued. Here, when replacing a noun to a variable, pattern extracting unit 526 adds to the variable a restriction corresponding to semantic class of the noun. By way of example, if the noun is a place name, a restriction such as "place name", and if it is a food, a restriction such as "food" is added to the variable. By this approach, it becomes possible to remove candidates having similar syntactic structure but semantically irrelevant.

For this purpose, question-answering system 500 includes, in addition to the extended unary pair DB 60 and extended binary pair DB 62 described above, extended pair DBs up to N-ary pair DB 530. Naturally, N may be N=2, and in that case, question-answering system 500 includes only the extended unary pair DB 60 and extended binary pair DB 62 as entailment pairs.

The patterns extracted by pattern extracting unit 526 are extended by pattern extending unit 528, using extended unary pair DB 60, extended binary pair DB 62, . . . extended N-ary pair DB 530. If the object of extension is a unary pair, pattern extending unit 528 extends the patterns using extended unary pair DB 60. Similarly, if the object of extension is a binary pair, pattern extending unit 528 extends the patterns using extended binary pair DB 62. Similar processing continues. Here, pattern extending unit 528 extends entailment pairs by successively using extended unary pair DB 60, extended binary pair DB 62, . . . extended N-ary pair DB 530. For this purpose, question-answering system 500 includes a selector 532 controlled by pattern extending unit 528 for selectively connecting that one of the extended pair DBs including extended unary pair DB 60, extended binary pair DB 62, . . . extended N-ary pair DB 530, which is designated by pattern extending unit 528, to pattern extending unit 528.

In this manner, the unary pairs, the binary pairs . . . N-ary pairs extracted by pattern extracting unit 526 are significantly extended by using entailment pairs stored in extended unary pair DB 60, extended binary pair DB 62, . . . extended N-ary pair DB 530, respectively. As a result, a huge number of patterns having restrictions on variables are output from pattern extending unit 528.

Question-answering system 500 includes a web archive 534 storing a huge amount of data on the web. An answer candidate searching unit 536 searches for and retrieves sentences having expressions matching a large number of patterns output from pattern extending unit 528 from web archive 534, and classifies and outputs the retrieved results by determining to which pair stored in which extended pair DB each sentence matches. The answer candidates output from answer candidate searching unit 536 are classified and stored respectively in unary answer candidate storage unit 538, a binary answer candidate storage unit 540, . . . N-ary answer candidate storage unit 542. Answer candidate searching unit 536 includes a machine-learning determiner trained beforehand with training data. The determiner searches for and retrieves answer candidates in accordance with various factors including semantic class of words included in patterns, a pattern used for searching and retrieving the answer candidates, semantic similarity between a pattern and the original question sentence, degree of relatedness between an answer candidate and a pattern used for extracting it, and adds to each answer candidate a score indicating aptness as an answer to question 502.

Question-answering system 500 further includes: a threshold value storage unit 546 storing threshold values prepared beforehand for selecting an answer from answer candidates stored in unary answer candidate storage unit 538, a binary answer candidate storage unit 540, . . . N-ary answer candidate storage unit 542; and an answer selecting unit 548 selecting, from answer candidates stored in unary answer candidate storage unit 538, a binary answer candidate storage unit 540, . . . N-ary answer candidate storage unit 542, only one answer having a score not lower than the threshold value stored in threshold value storage unit 546.

At the time of selection, if there are answer candidates retrieved by using a pattern having the largest number of variables among the answer candidates, first, answer selecting unit 548 selects that one of these candidates which has the highest score not lower than the threshold value, as an answer. If there is no such candidate, answer selecting unit 548 tries to select an answer from answer candidates retrieved by using patterns having the variable decreased by one. Thereafter, similar processing is continued until the number of variables reaches 1. In this manner, answer selecting unit 548 selects an answer with priority on the answer candidates retrieved by using patterns having larger number of variables. Therefore, question-answering system 500 includes a selector 544 selecting and coupling to an input of answer selecting unit 548 any of N-ary answer candidate storage unit 542, . . . binary answer candidate storage unit 540 and unary answer candidate storage unit 538, under the control of answer selecting unit 548.

If an answer candidate that satisfies the condition cannot be found even when all answer candidates up to those retrieved by using unary pairs are checked, an answer candidate is selected in accordance with a predetermined standard.

The threshold value for selecting an answer candidate may be constant regardless of the number of variables included in the pattern used for searching for and retrieving the candidates, or the threshold value may be made smaller as the number of variables increases. If none of the found answer candidates satisfy the condition, one among the found candidates that has the highest score may be selected as an answer, or one among the answer candidates retrieved by using a pattern having the largest number of variables that has the highest score may be selected.

The answer selected by answer selecting unit 548 is passed to answer output unit 550. Answer output unit 550 outputs this answer as an answer 504 in a form corresponding to the input form, on a path corresponding to the input path of question 502. By way of example, when question 502 is input through a microphone provided in question-answering system 500, answer output unit 550 converts the answer 504 to a voice and outputs it through a speaker. If question 502 is transmitted as a voice through a network, answer output unit 550 transmits data processed to output the answer as a voice, to the address that has transmitted the question 502.

As described above, question-answering system 500 in accordance with the second embodiment extends a pattern obtained from question 502, using extended unary pair DB 60, extended binary pair DB 62, . . . extended N-ary pair DB 530 extended by entailment pattern pair extension apparatus 50 in accordance with the first embodiment. The number of such extended pairs is huge, and the number of patterns obtained from question 502 also becomes huge. Using such a huge number of patterns, answer candidates are retrieved from web archive 534. Therefore, it becomes highly possible that even an expression having a syntactic structure much different from question 502 is selected as an apt answer. Further, since pattern pairs are extended using the transitivity, it becomes highly possible that an unexpected pattern different from the pattern obtained from question 502 is obtained as an answer. Further, answer candidates retrieved by using patterns having larger number of variables are selected with priority. As a result, possibility becomes higher that a more specific and appropriate answer to question 502 can be obtained.

[Computer Implementation]

Figure 11:
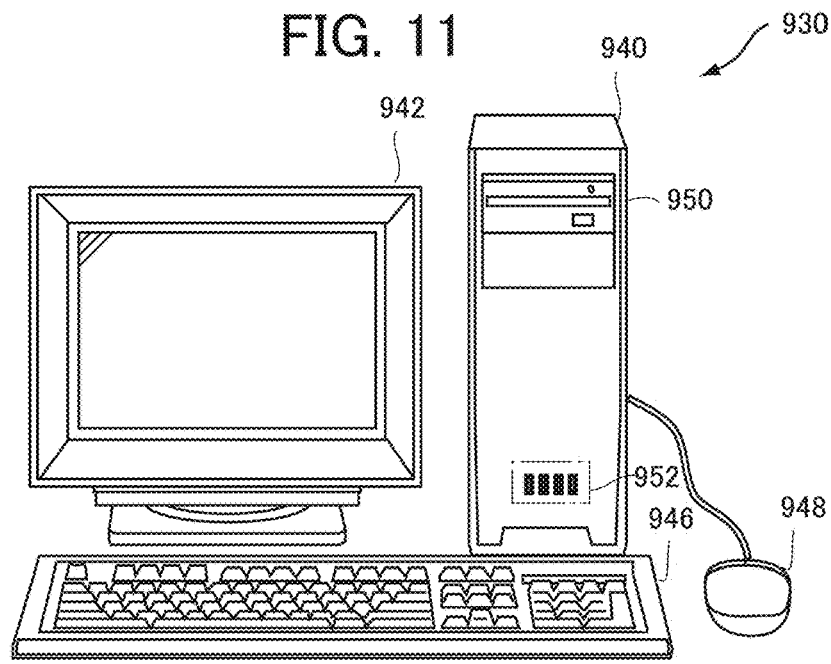
FIG. 11 shows an appearance of a computer system realizing the entailment pattern extension apparatus in accordance with the first embodiment and the question-answering system in accordance with the second embodiment of the present invention.

The entailment pattern pair extension apparatus 50 in accordance with the first embodiment, the question-answering system 500 in accordance with the second embodiment and other modifications can be implemented by computer hardware and computer programs executed on the computer hardware. FIG. 11 shows an appearance of computer system 930 and FIG. 12 shows an internal configuration of computer system 930.

Referring to FIG. 11, computer system 930 includes a computer 940 having a memory port 952 and a DVD (Digital Versatile Disk) drive 950, a keyboard 946, a mouse 948, and a monitor 942.

Figure 12:
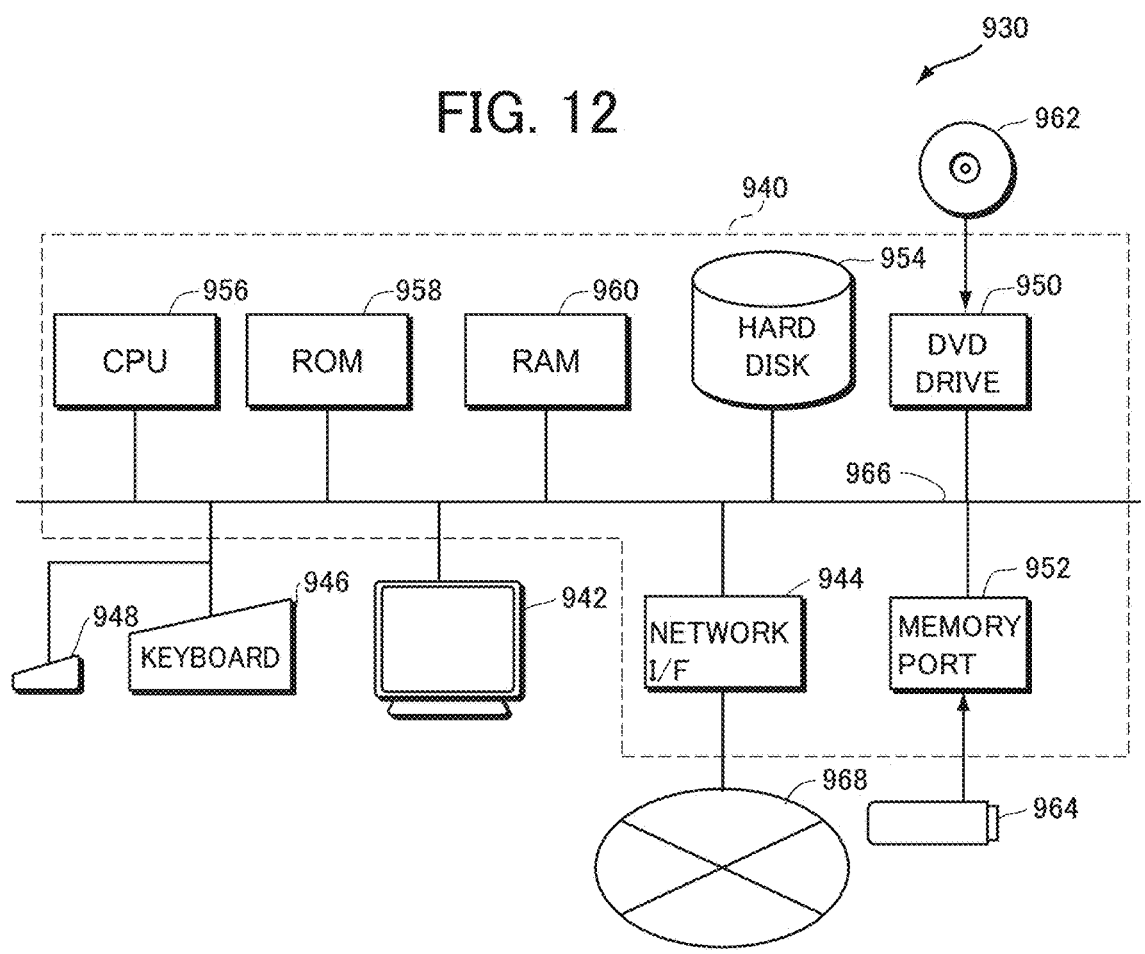
FIG. 12 is a hardware block diagram showing an internal configuration of the computer shown in FIG. 11.

Referring to FIG. 12, computer 940 includes, in addition to memory port 952 and DVD drive 950, a CPU (Central Processing Unit) 956, a bus 966 connected to CPU 956, memory port 952 and DVD drive 950, a read only memory (ROM) 958 storing a boot-up program and the like, a random access memory (RAM) 960 connected to bus 966, storing program instructions, a system program and work data, and a hard disk 954. Computer system 930 further includes a network interface (I/F) 944 providing the connection to a network 968 allowing communication with another terminal.

A removable memory 964 that can be attached to/detached from RAM 960, hard disk 954 and memory port 952 functions as a storage device, such as the first unary DB 52, the second unary DB 54, verb entailment DB 56, context similarity storage unit 58, extended unary pair DB 60, extended binary pair DB 62, kanji-character dictionary 106 and binary pair generation rule storage unit 110 shown in FIG. 1, as well as extended N-ary pair DB 530, web archive 534, answer candidate storage units 538, 540 and 542, maximum term number storage unit 524 and threshold value storage unit 546. Data that does not require overwriting of information, such as kanji-character dictionary 106, may be stored in a CD-ROM or DVD 962, and may be loaded to DVD drive 950 and read therefrom.

The computer program causing computer system 930 to function as each functional unit of entailment pattern pair extension apparatus 50 or question-answering system 500 in accordance with the embodiments above is stored in a DVD 962 or a removable memory 964 loaded to DVD drive 950 or to memory port 952, and transferred to hard disk 954. Alternatively, the program may be transmitted to computer 940 through network 968, and stored in hard disk 954. At the time of execution, the program is loaded to RAM 960. The program may be directly loaded from DVD 962, removable memory 964 or through network 968 to RAM 960.

The program includes a plurality of instructions to cause computer 940 to function as each functional unit of entailment pattern pair extension apparatus 50 or question-answering system 500 in accordance with the embodiments above. Some of the basic functions necessary to cause the computer 940 to perform these operations are provided by the operating system running on computer 940, by a third party program, or by various programming tool kits or dynamically linkable program library, installed in computer 940 and dynamically liked and executed when the program is executed. Therefore, the program may not necessarily include all of the functions necessary to realize the system and method of the present embodiment. The program has only to include instructions to realize the functions of the above-described system by dynamically calling, at the time of execution, appropriate functions or appropriate program tools in a program tool kit or program library in a manner controlled to attain desired results. Naturally, all the necessary functions may be provided by the program only.

Further, various functional units of entailment pattern pair extension apparatus 50 or question-answering system 500 may be distributed to separate computers to be processed, or may be distributed to separate computers located at different areas through a network to be processed.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention is applicable to a system that uses natural language and requires natural language processing in a unified and efficient manner using various language expressions, such as a question-answering system, guidance system, and by a robot dialog system.

REFERENCE SIGNS LIST 50 entailment pattern pair extension apparatus
52 first unary DB
54 second unary DB
56 verb entailment DB
58 context similarity degree storage unit
60 extended unary pair DB
62 extended binary pair DB
100 unary pair adding unit
102 unary pair DB
104 unary pair generating unit
106 kanji-character dictionary
108 unary pair extension unit
110 binary pair generation rule storage unit
112 binary pair adding unit
164 context similarity degree calculation process
180 record reading unit
182 passive voice/potentials adding unit
184 transitivity pair adding unit
500 question-answering system
522 syntactic analysis unit
526 pattern extracting unit
528 pattern extending unit
534 web archive
536 answer candidate searching unit
548 answer selecting unit

The invention claimed is:

1. An entailment pair extension apparatus for extending entailment pairs by generating n-term entailment pairs from m-term entailment pairs, said entailment pair extension apparatus comprising:
  generation rule storage means comprising a non-transitory computer readable medium for storing generation rules for generating said n-term entailment pairs from said m-term entailment pairs, wherein:
    m and n are integer not smaller than 0 and satisfying m <n;
    each of said m-term entailment pairs include a first language pattern and a second language pattern;
    the first language pattern and the second language pattern each comprise a combination of a verb phrase and m terms;
    the second language pattern has a semantic relation with the first language pattern such that the verb of the first language pattern entails the verb of the second language pattern;
    said generation rules each define:
      a condition to be satisfied by an m-term entailment pair before said generation rule is applied to the m-term entailment pair, and
      a language pattern modification rule specifying:
        for each of the language patterns constituting said m-term entailment pair, addition of n minus m variables to the language pattern by adding one or more variables at one or more locations in the language pattern if said condition is satisfied;
      a processor configured to generate an n-term entailment pair from each m-term entailment pair of the m-term entailment pairs by:
    receiving said m-term entailment pair;
    for each of the generation rules stored in said generation rule storage means, determining whether or not the m-term entailment pair satisfies the condition of the generation rule; and
    when said modification rule of the generation rule is determined to be satisfied, applying said modification rule to each language pattern constituting said m-term entailment pair to generate, the n-term entailment pair; and storing the n-term entailment pair generated by applying said modification rule.

2. The entailment pair extension apparatus according to claim 1, wherein
said m is 0; and
said m-term entailment pair is an entailment pair of verb phrases, each consisting of a verb phrase.

3. The entailment pair extension apparatus according to claim 2, wherein said n is 1.

4. The entailment pair extension apparatus according to claim 1, wherein the processor is further configured to apply transitivity to said m-term entailment pair to extend said m-term entailment pair.

5. A computer program configured to cause a computer to perform the functions performed by the processor as described in claims 1 to 4 claim 1.

6. A question-answering system, comprising:
entailment pair storage means comprising a non-transitory computer readable medium for storing entailment pairs extended by the entailment pair expansion apparatus according to claim 1;
document storage means comprising a non-transitory computer readable medium for storing a plurality of documents;
a processor configured to:
receive a question and perform syntactic analysis of the question to extract one or more language patterns matching a pattern of an answer to the question;
extend each of the extracted language patterns using the entailment pairs stored in said entailment pair storage means;
search for and retrieve from documents stored in said entailment pair storage means an expression matching at least one of the extended language patterns;
calculate a score for each of the retrieved expressions indicating aptness as an answer to said question; and
select a retrieved expression as an answer based on said calculated score, giving priority to retrieved expressions having a larger number of variables matching an extended language pattern during the search.

* * * * *